Dec. 8, 1925.    1,564,297
A. VALTMAN
LATHE DOG
Filed July 1, 1924
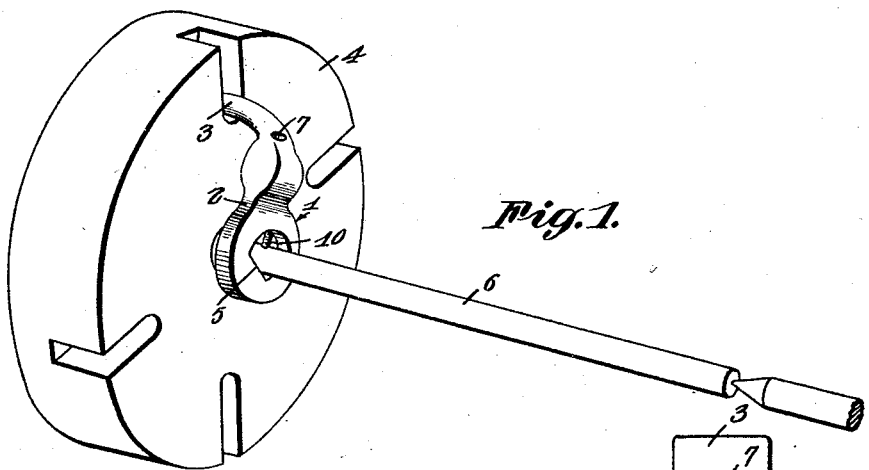
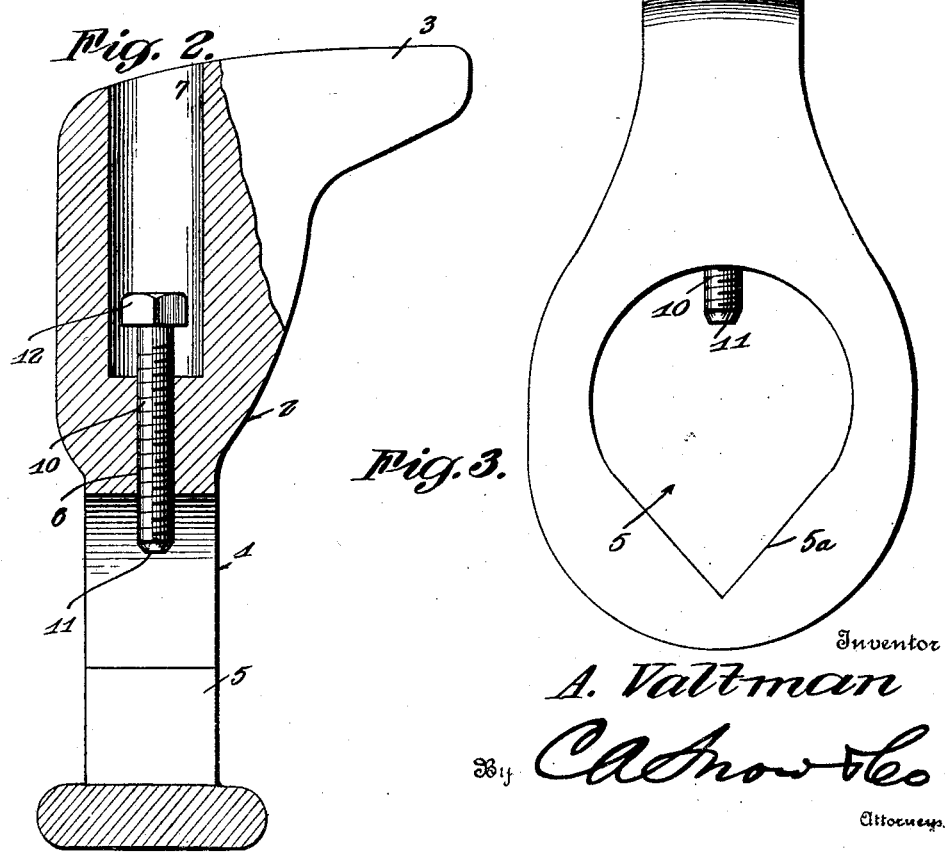
Inventor
A. Valtman Patented Dec. 8, 1925.

1,564,297

UNITED STATES PATENT OFFICE.

ANTON VALTMAN, OF COLERAINE, MINNESOTA.

LATHE DOG.

Application filed July 1, 1924. Serial No. 723,555.

*To all whom it may concern:*

Be it known that I, ANTON VALTMAN, a citizen of the United States, residing at Coleraine, in the county of Itasca and State of Minnesota, have invented a new and useful Lathe Dog, of which the following is a specification.

This invention relates to lathe-dogs and the object thereof is to provide a dog of this character having no projecting parts which are liable to engage the person or clothing of the operator and which is so constructed and arranged that the work engaging device and its operating member will lie within the body of the dog and be evenly balanced.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a perspective view of a portion of a lathe showing this improved dog mounted thereon;

Fig. 2 is a longitudinal section partly in elevation through the guide opening for the work with this improved work engaging device shown mounted therein; and Fig. 3 is a front elevation of the dog.

In the embodiment illustrated a dog 1 is shown, the main features of which are well known. This dog comprises a body portion 2 preferably made smaller at its upper end and having projecting laterally from one face thereof a finger or bar 3 by means of which the dog may be connected with a rotatable supporting device such as the face plate of a lathe shown at 4 in Fig. 1 of the drawings. This dog 1 is provided in its large end with an opening 5 to receive the work shown at 6 in the form of a rod supported at its ends by the lathe centers, the dog serving to rotate the same against a cutting tool or other implement. Ordinarily a work engaging screw is threaded into the body of the dog and projects into the work receiving opening 5 while the head thereof projects beyond the edge of the dog and is liable to, and frequently does, come in contact with the person or clothing of the operator and cause injury thereto.

This invention is designed to overcome these objectionable features and is accomplished by forming a socket 7 in the smaller end of the dog having a threaded bore 8 connecting said socket with the work receiving opening 5. Mounted in the bore 8 is a threaded set screw or bolt 10 threaded into the bore and of a length greater than the length of the bore so that its inner end 11 will project some distance into the opening 5 which end is designed to engage the work 6 and planting it secure in the opening 5, said opening being here shown substantially heart-shaped in form to provide gripping faces 5ª which cooperate with the bolt 10 to secure the work. The head 12 of the bolt is mounted and housed in the socket 7 being accessible by means of a socket wrench, not shown, for moving it toward or away from the work to be held.

This arrangement of the bolt 10 longitudinally in the body 2 of the dog provides for the even balancing of the dog and avoids all the objectionable features above set forth and of having auxiliary means for adjusting the bolt carried by the dog.

The operation of the device will be readily understood from the foregoing description and it will be apparent that the work engaging device herein shown will not project beyond the outer face of the dog at any point.

I claim:—

A lathe dog comprising a body having a work receiving opening therein with an L-shaped arm carried by the top thereof, one member of said arm extending radially from said body and the other member projecting laterally to form the lathe engaging finger, the radially extending member of said arm having a socket opening through the outer end thereof with a bore connecting said socket with said opening, and a work-clamping screw threaded in said bore and having its head housed and completely protected within said socket, said screw and arm operating to evenly balance the dog.

In testimony that I claim the foregoing as my own, I have hereto affixed my signature.

ANTON VALTMAN.